(12) United States Patent
Lau

(10) Patent No.: US 9,973,090 B1
(45) Date of Patent: May 15, 2018

(54) BUCK BOOST CONVERTER AND CONTROL METHOD THEREOF

(71) Applicant: Silicon Mitus, Inc., Seongnam-si (KR)

(72) Inventor: Kin Keung Lau, Redwood City, CA (US)

(73) Assignee: Silicon Mitus, Inc., Seongnam-Si (KR)

( * ) Notice: Subject to any disclaimer, the term of this patent is extended or adjusted under 35 U.S.C. 154(b) by 0 days. days.

(21) Appl. No.: 15/298,397

(22) Filed: Oct. 20, 2016

(51) Int. Cl.
*H02M 3/156* (2006.01)
*H02M 3/158* (2006.01)
*H02M 3/06* (2006.01)

(52) U.S. Cl.
CPC ........... *H02M 3/1582* (2013.01); *H02M 3/06* (2013.01); *H02M 3/156* (2013.01)

(58) Field of Classification Search
CPC .... H02M 3/1582; H02M 3/1584; H02M 1/08; H02M 1/088; H02M 3/04; H02M 3/06; H02M 3/158; H02M 2001/0009; H02M 3/156
See application file for complete search history.

(56) References Cited

U.S. PATENT DOCUMENTS

| | | | | |
|---|---|---|---|---|
| 5,973,944 A * | 10/1999 | Nork | ....................... | H02M 1/44 307/110 |
| 7,863,869 B1 * | 1/2011 | De Stasi | ............... | H02M 3/156 323/222 |
| 2009/0027925 A1 * | 1/2009 | Kanouda | ............. | H02M 1/4233 363/21.13 |
| 2011/0187336 A1 * | 8/2011 | Wu | ........................... | G05F 1/10 323/282 |
| 2012/0146594 A1 * | 6/2012 | Kobayashi | .......... | H02M 3/1582 323/234 |
| 2013/0107769 A1 * | 5/2013 | Khlat | .................... | H03F 1/0227 370/310 |
| 2015/0009733 A1 * | 1/2015 | Takaki | ................. | H02M 7/537 363/97 |
| 2015/0256078 A1 * | 9/2015 | Tanabe | ................ | H02M 3/1582 323/271 |
| 2016/0373009 A1 * | 12/2016 | Tateishi | ................ | H02M 3/156 |

* cited by examiner

*Primary Examiner* — Gustavo Rosario Benitez
(74) *Attorney, Agent, or Firm* — Harness, Dickey & Pierce, P.L.C.

(57) ABSTRACT

The present invention provides a buck-boost converter including a converter power stage, a first mode control unit, and a second mode control unit. In the buck-boost converter, the converter power stage may include at least one inductor and a plurality of switching devices. Further, the first mode control unit may operate the converter power stage in a buck mode and regulate an output voltage of the converter power stage as a first voltage. Further, the second mode control unit may operate the converter power stage in a boost mode or a buck-boost mode, and regulate an output voltage of the converter power stage as a second voltage higher than the first voltage.

12 Claims, 8 Drawing Sheets

BUCK BOOST CONVERTER AND CONTROL METHOD THEREOF

BACKGROUND OF THE INVENTION

1. Field of the Invention

The present invention relates to a converter for converting a power.

2. Description of the Prior Art

A buck type converter, a boost type converter, and a buck-boost type converter have been widely known as switch-mode converters for converting a power using a power semiconductor.

The buck type converter is referred to as a step-down converter because of outputting an output voltage to be lower than an input voltage. In the buck type converter, a ratio of the input voltage to the output voltage is proportional to a duty cycle (D) of the power semiconductor.

The boost type converter is referred to as a step-up converter because of outputting an output voltage to be higher than an input voltage. In the boost type converter, generally, the ratio of the input voltage to the output voltage is inversely proportional to (1-D).

The buck-boost type converter may allow the output voltage to be lower or higher than the input voltage. The buck-boost type converter is referred to as a flyback converter.

Meanwhile, the converter may be fixed in one type, or may operate while being changed in multiple types. For example, one converter may operate in a buck mode in a first time period and may operate in a boost mode in a second time period. Further, one converter may operate in a buck mode in the first time period and may operate in a buck-boost mode in the second time period.

When the input voltage is supplied from a battery, one converter may operate in a plurality of types as described above in order to supply a proper voltage to a load (e.g., an arithmetic processor).

Specifically, a voltage is changed according an amount of charge (e.g., State-Of-Charge (SOC)) in the battery. The battery voltage is high when the SOC is high, and the battery voltage is low when the SOC is low. The converter makes the output voltage lower than the input voltage and outputs the output voltage when the battery voltage is high. Further, the converter makes the output voltage higher than the input voltage and then outputs the output voltage when the battery voltage is low. To this end, the converter operates in the buck mode when the battery voltage is high and operates in the boost mode or the buck-boost mode when the battery voltage is low.

A plurality of technologies, which maximize the efficiency of the converter when the converter is fixed in one type, are open to the public. However, a technology for maximizing the efficiency of the converter when the converter operates in two or more modes (e.g., buck mode and buck-boost mode) as described above is difficult to be found.

In this background, in accordance with an aspect of the present invention, there is provided a technology for improving an efficiency of a converter operating in a plurality of modes.

In order to achieve the aspect, in one aspect, the present invention provides a buck-boost converter including a converter power stage, a first mode control unit, and a second mode control unit.

In the buck-boost converter, the converter power stage may include at least one inductor and a plurality of switching devices. Further, the first mode control unit may operate the converter power stage in a buck mode and regulate an output voltage of the converter power stage as a first voltage. Further, the second mode control unit may operate the converter power stage in a boost mode or a buck-boost mode, and regulate an output voltage of the converter power stage as a second voltage higher than the first voltage.

In another aspect, the present invention provides a buck-boost converter including a converter power stage, a converter control unit, and an output voltage variation unit.

In the buck-boost converter, the converter power stage may include a first switching device, a second switching device, a third switching device, a fourth switching device, and a sensing resistance. Further, in an aspect of the arrangement of these elements, one side of the first switching device may be connected to an input voltage and the other side thereof may be connected to the inductor. Further, one side of the second switching device may be connected to the first switching device and the inductor and the other side thereof may be connected to a low voltage line. In addition, one side of the third switching device may be connected to an output capacitor and the other side thereof may be connected to the inductor. Further, one side of the fourth switching device may be connected to the third switching device and the inductor and the other side thereof may be connected to the low voltage line. Further, the sensing resistance may sense a voltage of the output capacitor.

In the buck-boost converter, the converter control unit may operate the converter power stage in one mode of the buck mode and the boost mode, or one mode of the buck mode and the buck-boost mode. Further, the output voltage variation unit may adjust a size of the sensing resistance according to an operation mode of the converter power stage and then change the output voltage of the converter power stage.

Meanwhile, in the buck-boost converter, the converter control unit may regulate the output voltage of the converter power stage according to a feedback voltage input through the sensing resistance, and the output voltage variation unit may adjust the size of the sensing resistance to allow the output voltage in the buck mode to be higher than the output voltage in the boost mode or the buck-boost mode.

In another aspect, the present invention provides a method of controlling a converter including at least one inductor and a plurality of switching devices.

The control method may include: operating a converter in a buck mode and regulating an output voltage of the converter as a first voltage; changing an operation mode of the converter to a boost mode or a buck-boost mode when an input voltage of the convert is to be lower than a first configuration voltage while the converter operates in the buck mode; operating the converter in the boost mode or the buck-boost mode and regulating the output voltage of the converter as a second voltage higher than the first voltage; and changing the converter to be in the buck mode when the input voltage of the converter is to be higher than a second configuration voltage while the converter operates in the boost mode or the buck-boost mode.

According to the present invention as described above, an efficiency of a converter which operates in a plurality of modes can improve.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
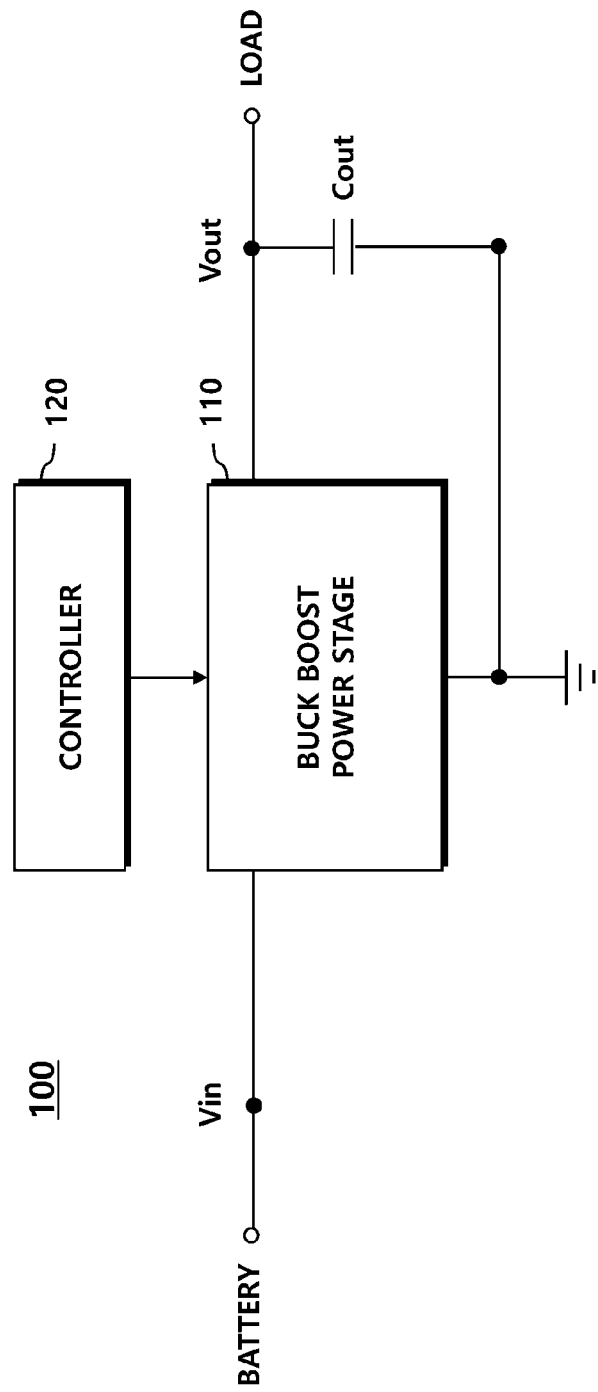
FIG. 1 illustrates a configuration of a converter according to an embodiment of the present invention.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates a configuration of a converter according to an embodiment of the present invention.

Referring to FIG. 1, a converter 100 may include a power stage 110, a controller 120, an output capacitor (Cout), or the like.

Since the converter 100 may operate in a buck mode, or may operate in a boost mode or a buck-boost mode, the converter 100 may be referred to as a buck-boost converter, but the present invention is not limited thereto.

The power stage 110 may include an inductor and a plurality of switching devices, for example, a power semiconductor. The controller 120 may operate the power stage 110 by controlling the switching device to be turned on/off, and may operate the power stage 110 as the boost mode or the buck-boost mode.

Figure 2:
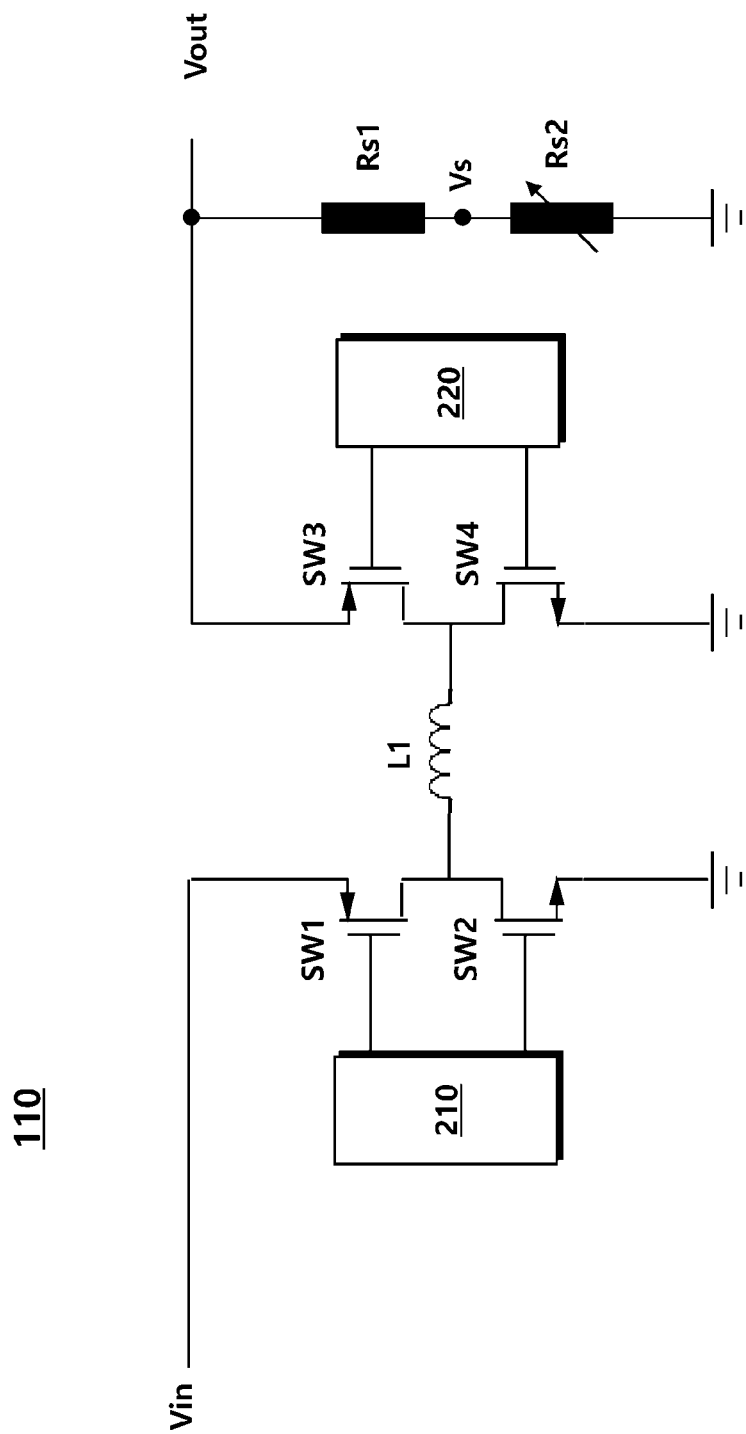
FIG. 2 illustrates a configuration of a power stage according to an embodiment of the present invention.

FIG. 2 illustrates a configuration of a power stage according to an embodiment of the present invention.

Referring to FIG. 2, the power stage 110 may include an inductor L1 and a plurality of switching devices SW1, SW2, SW3, and SW4.

Further, in the power stage 110, drivers 210 and 220, which control each of switching devices SW1, SW2, SW3, and SW4 to be turned on/off, may be arranged. Depending on the interpretation, the drivers 210 and 220 may be viewed as being included in the controller 120 in FIG. 1.

The switching devices SW1, SW2, SW3, and SW4 may be arranged in a form in which the power stage 110 operates in a buck mode and a boost mode or the buck mode and a buck-boost mode.

For a specific example, referring to FIG. 2, a first switching device SW1 may be arranged to allow one side of the first switching device SW1 to be connected to an input voltage Vin and allow the other side of the first switching device SW1 to be connected to the inductor L1. Further, one side of a second switching device SW2 may be connected to the first switching device SW1 and the inductor L1, and the other side thereof may be connected to a low-voltage line, for example, an earth or a ground.

As shown in FIG. 2, a structure, in which the first switching device SW1, the second switching device SW2, and the inductor L1 are arranged, is a representative example of the buck type converter. In FIG. 2, when a third switching device SW3 is constantly turned on, a fourth switching device SW4 is constantly turned off, and the first switching device SW1 and the second switching device SW2 are inversely controlled with each other, the power stage 110 operates in the buck mode.

Meanwhile, one side of the third switching device SW3 may be connected to an output capacitor and the other side thereof may be connected to the inductor L1. Further, one side of the fourth switching device SW4 may be connected to the third switching device SW3 and the inductor L1 and the other side thereof may be connected to the low voltage line.

In a structure in which the switching devices SW1, SW2, SW3, and SW4 and the inductor L1 are arranged as shown in FIG. 2, when the first switching device SW1 and the fourth switching device SW4 are synchronized and controlled, and the second switching device SW2 and the third switching device SW3 are synchronized and controlled, the power stage 110 operates in the buck-boost mode.

Further, in FIG. 2, when the first switching device SW1 is constantly turned on, the second switching device SW2 is constantly turned off, and the third switching device SW3 and the fourth switching device SW4 are inversely controlled each other, the power stage 110 operates in the boost mode.

The power stage 110 may include sensing resistances Rs1 and Rs2 for sensing an output voltage Vout. The sensing resistances Rs1 and Rs2 may be configured by a first resistance Rs1 and a second resistance Rs2 in a form of voltage divider.

A sensing voltage Vs generated in the sensing resistances Rs1 and Rs2 may be transferred to the controller 120 in FIG. 1. Further, the controller 120 in FIG. 1 may regulate the output voltage Vout of the power stage 110 using the sensing voltage Vs.

Meanwhile, the controller 120 in FIG. 1 may change an operation mode of the power stage 110 through a control for the drivers 210 and 220. Further, the controller 120 in FIG. 1 may differently control the output voltage Vout for each operation mode by adjusting a size of the sensing resistances Rs1 and Rs2.

Figure 3:
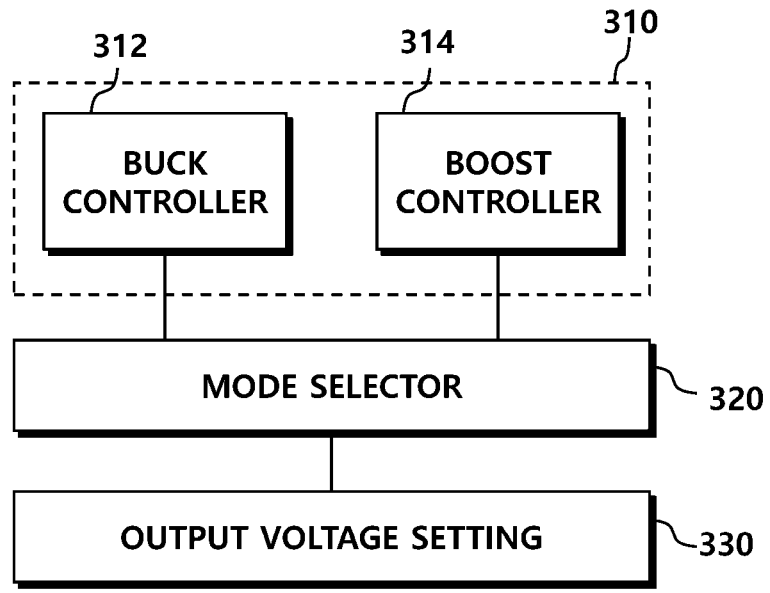
FIG. 3 illustrates a configuration of a controller 120 according to an embodiment of the present invention.

FIG. 3 illustrates a configuration of a controller 120 according to an embodiment of the present invention.

Referring to FIG. 3, the controller 120 may include a converter control unit 310, a mode conversion unit 320, and an output voltage variation unit 330.

The converter controller 310 may include a first mode control unit 312 for operating the power stage 110 in FIG. 2 in the buck mode, and a second mode control unit 314 for operating the power stage 110 in FIG. 2 in the boost mode or the buck-boost mode.

The mode conversion unit 320 allows one of the first mode control unit 312 and the second mode control unit 314 to selectively control the power stage 110 in FIG. 2.

In addition, the output voltage variation unit 330 changes a configuration by which the output voltage of the power stage 110 in FIG. 2 is to be variable. For example, the converter control unit 310 may receive the sensing voltage Vs in FIG. 2 through the sensing resistance of the power stage 110 in FIG. 2. Further, the converter control unit 310 may compare the sensing voltage Vs in FIG. 2, as a feedback voltage, with a reference voltage and then regulate the output voltage of the power stage 110 in FIG. 2. In the embodiment, the output voltage variation unit 330 may allow the output voltage to be variable by adjusting the sensing resistances Rs1 and Rs2 in FIG. 2 arranged in the power stage 110 in FIG. 2 and changing the sensing voltage Vs in FIG. 2. In this event, the sensing resistances Rs1 and Rs2 in FIG. 2 or one resistance among the sensing resistances, in particular, the second resistance Rs2 connected to the low voltage line may be a variable resistance or a programmable resistance.

The output voltage variation unit 330 may differently control the output voltage according to an operation mode of the power stage 110 in FIG. 2. The conventional converter has singly controlled the output voltage regardless of the operation mode, but an embodiment of the present invention may differently control the output voltage according to the operation mode of the power stage 110 in FIG. 2. When the output voltage is differently controlled according to the operation mode, an efficiency of the converter can increase.

Figure 4:
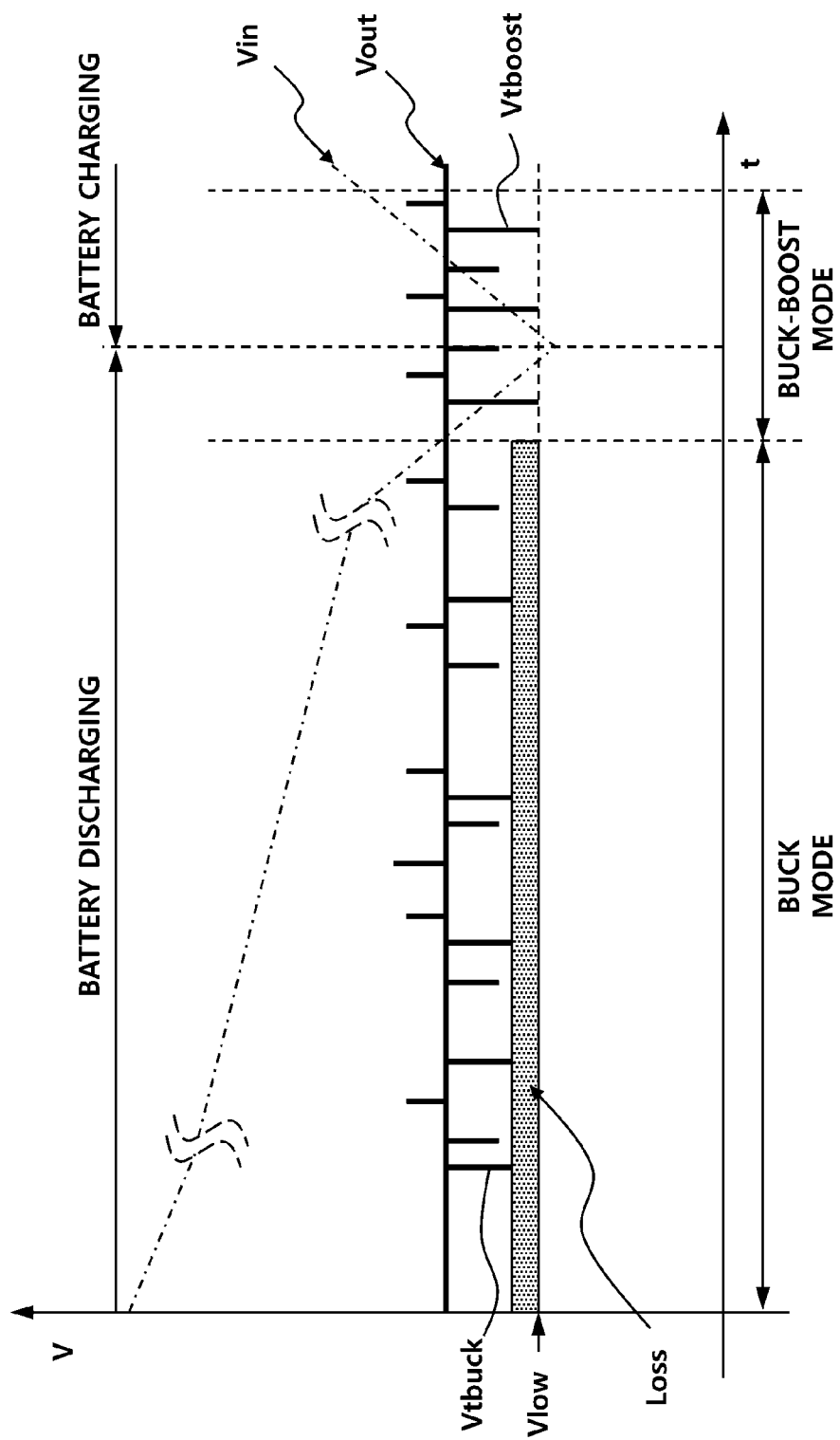
FIG. 4 illustrates a voltage waveform of a converter according to the prior art.

FIG. 4 illustrates a voltage waveform of a converter according to the prior art.

Referring to FIG. 4, a converter operates in two modes (buck mode and buck-boost mode). Further, the converter maintains a regular output voltage Vout in each mode.

The output voltage Vout is obtained by summing the minimum voltage Vlow and a transient voltage. The lower the output voltage Vout is the higher an efficiency of the converter is, but there is a minimum voltage Vlow requiring a load so that the converter should maintain the output voltage (Vout) to be higher than the minimum voltage Vlow. In particular, the transient voltage may be generated at the output voltage Vout according to a profile of the load, and the converter takes the transient into consideration to configure the output voltage Vout. For example, the converter assumes the worst transient, and configures the output voltage Vout as the sum of the transient voltage and the minimum voltage Vlow when the worst transient is generated.

It is known that the transient voltage is higher when the converter operates in the boost mode or the buck-boost mode in comparison with when the converter operates in the buck mode. In another aspect, when the buck-boost converter operates in the boost mode or the buck-boost mode in comparison with when operating in the buck mode, the transient of the output voltage is higher according to variation of the load.

For example, as shown in FIG. 4, a transient voltage Vtboost in the buck-boost mode is higher than a transient voltage Vtbuck in the buck mode.

Therefore, the conventional converter has configured the output voltage Vout as the minimum voltage Vlow and the transient voltage Vtboost in the boost mode or the buck-boost mode.

$$Vout = Vlow + Vtboost \quad \text{[Equation 1]}$$

In the case in which the output voltage Vout is controlled like as in the conventional converter, a voltage condition which the load requires can be satisfied, but there is a problem in that the output voltage Vout is configured to be high so that an efficiency of the converter is lowered when the converter operates in the buck mode.

The transient voltage Vtbuck when the converter operates in the buck mode is lower than the transient voltage Vtboost when the converter operates in the boost mode or the buck-boost mode so that a loss equal the difference thereof occurs according to the conventional scheme.

$$Loss \propto (Vtboost - Vtbuck) \quad \text{[Equation 2]}$$

As a specific example of the converter according to an embodiment of the present invention, the output voltage variation unit may improve the problem of the conventional scheme by changing the output voltage according to the operation mode of the power stage.

Figure 5:
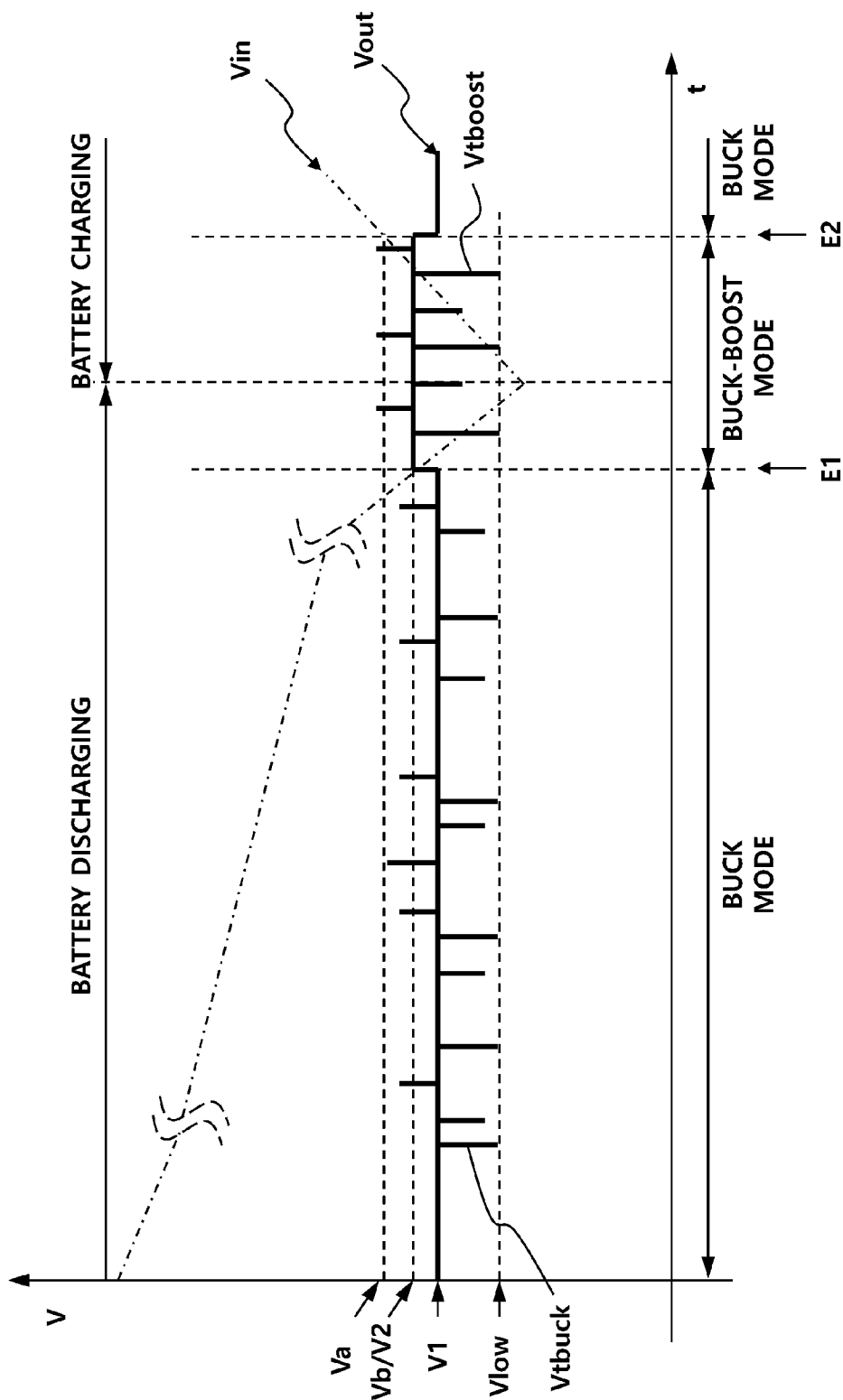
FIG. 5 illustrates a voltage waveform of a converter according to an embodiment of the present invention.

FIG. 5 illustrates a voltage waveform of a converter according to an embodiment of the present invention.

Referring to FIG. 5, when an input voltage Vin is in a high voltage range, for example, when the input voltage Vin is in a range higher than a first specific voltage Va in FIG. 5, a converter may operate a power stage in a buck mode.

Returning to FIG. 3, the first mode control unit 312 of the converter may operate the power stage in the buck mode. In this event, the first mode control unit 312 may regulate the output voltage Vout as the first voltage V1.

Herein, the first voltage V1 may correspond to a voltage which is higher by the transient voltage Vtbuck than the minimum voltage Vlow.

$$V1 = Vlow + Vtbuck \quad \text{[Equation 3]}$$

Referring to FIG. 5, when an input voltage Vin is in a low voltage range, for example, when the input voltage Vin is in a range lower than a second specific voltage Vb in FIG. 5, the converter may operate the power stage in the boost mode or the buck-boost mode.

Returning to FIG. 3, the second mode control unit 314 of the converter may operate the power stage in the boost mode or the buck-boost mode. In this event, the second mode control unit 314 may regulate the output voltage Vout as the second voltage V2.

Herein, the second voltage V2 may correspond to a voltage which is higher by the transient voltage Vtboost of the boost mode or the buck-boost mode from the minimum voltage Vlow.

$$V2 = Vlow + Vtboost \quad \text{[Equation 4]}$$

The first voltage V1 may be lower than the second voltage V2. Since the transient voltage Vtboost in the boost mode or the buck-boost mode is lower than the transient voltage Vtbuck in the buck mode, the first voltage V1 may be configured to be lower than the second voltage V2.

Since the output voltage Vout is configured to be low in the buck mode in comparison with the prior art, an efficiency of the whole converter or system increases as much.

Generally, a converter which outputs 3V voltage using a 4.2V battery may operate in the buck mode in a 90% range of a charge capacity. In this event, when a difference between the first voltage V1 and the second voltage V2 is 0.1V, an efficiency improvement effect of 3% is generated as below.

$$\text{Efficiency gain} = 0.1V/3V \times 0.9 = 3\%$$ [Equation 5]

Meanwhile, the converter may change an operation mode by using an internal measurement value of the input voltage or the output voltage without an external command. For example, the converter may compare the input voltage Vin with a configuration voltage and then change the operation mode according to a result of the comparison.

Figure 6:
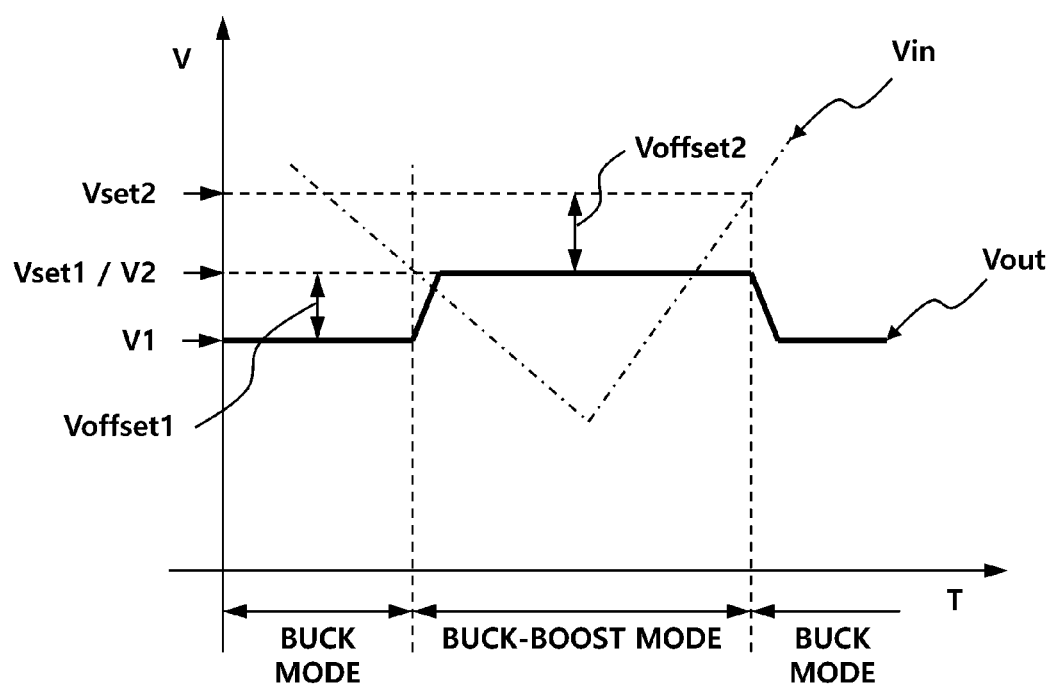
FIG. 6 illustrates an operation mode change time point of a converter according to an embodiment of the present invention.

FIG. 6 illustrates an operation mode change time point of a converter according to an embodiment of the present invention.

Referring to FIG. 6, a converter, for a specific example, the mode conversion unit 320 described with reference to FIG. 3 may compare an input voltage Vin with configuration voltages Vset1 and Vest2, and change an operation mode according to a result of the comparison.

For example, the converter operates in a buck mode, and then may change the operation mode to a boost mode or a buck-boost mode when the input voltage Vin is to be lower than a first configuration voltage Vset1.

Further, the converter operates in the boost mode or the buck-boost mode, and then may change the operation mode to the buck mode when the input voltage Vin is to be higher than a second configuration voltage Vset2.

The configuration voltages Vset1 and Vset2 may be configured by interworking with an output voltage Vout. For example, the configuration voltages Vset1 and Vset2 may be configured by a sum of the output voltage Vout and offset voltages Voffset1 and Voffset2.

The offset voltages may have different values according to an operation mode and, for example, the first offset voltage Voffset1 may be applied in a buck mode, and the second offset voltage Voffset2 may be applied in a boost mode or a buck-boost mode.

The second configuration voltage Vset2 may be configured to be higher than the first configuration voltage Vset1. Therefore, a change of the operation mode may be performed as if it includes a hysteresis band.

Figure 7:
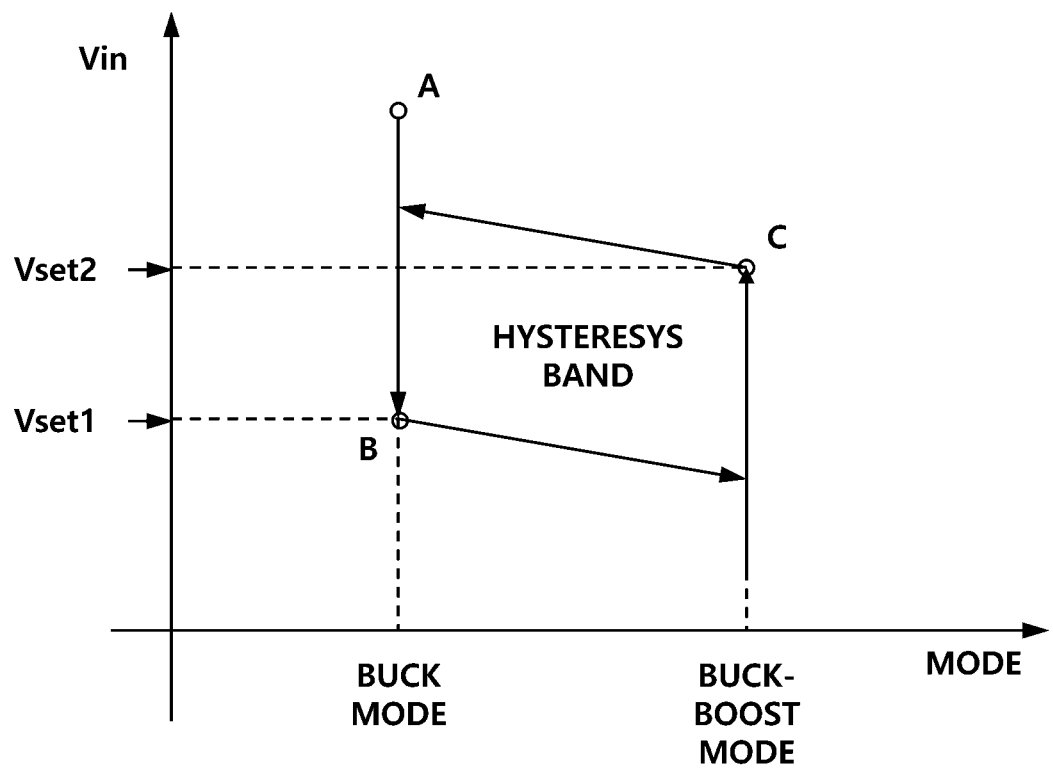
FIG. 7 illustrates a hysteresis band applied to change of the operation mode.

FIG. 7 illustrates a hysteresis band applied to a change of the operation mode.

Referring to FIG. 7, a converter may operate in a buck mode at an A point. Then, when an input voltage Vin is to be lower than a first configuration voltage Vset1 (reaches a B point), the converter may change the mode and then operate in a boost mode or a buck-boost mode.

When the input voltage Vin is to be higher than a second voltage Vset2 (reaches a C point), the converter which operates in the boost mode or the buck-boost mode may change the mode and then operate in the buck mode.

Meanwhile, the converter, for a specific example, the mode conversion unit 320 described with reference to FIG. 3 may change the operation mode according to an event. For an example, the converter includes a comparator, and may change the operation mode according to an event generated by the comparator. Herein, the comparator may compare the input voltage Vin and the configuration voltages Vset1 and Vset2, and may include a hysteresis band as shown in FIG. 7.

Figure 8:
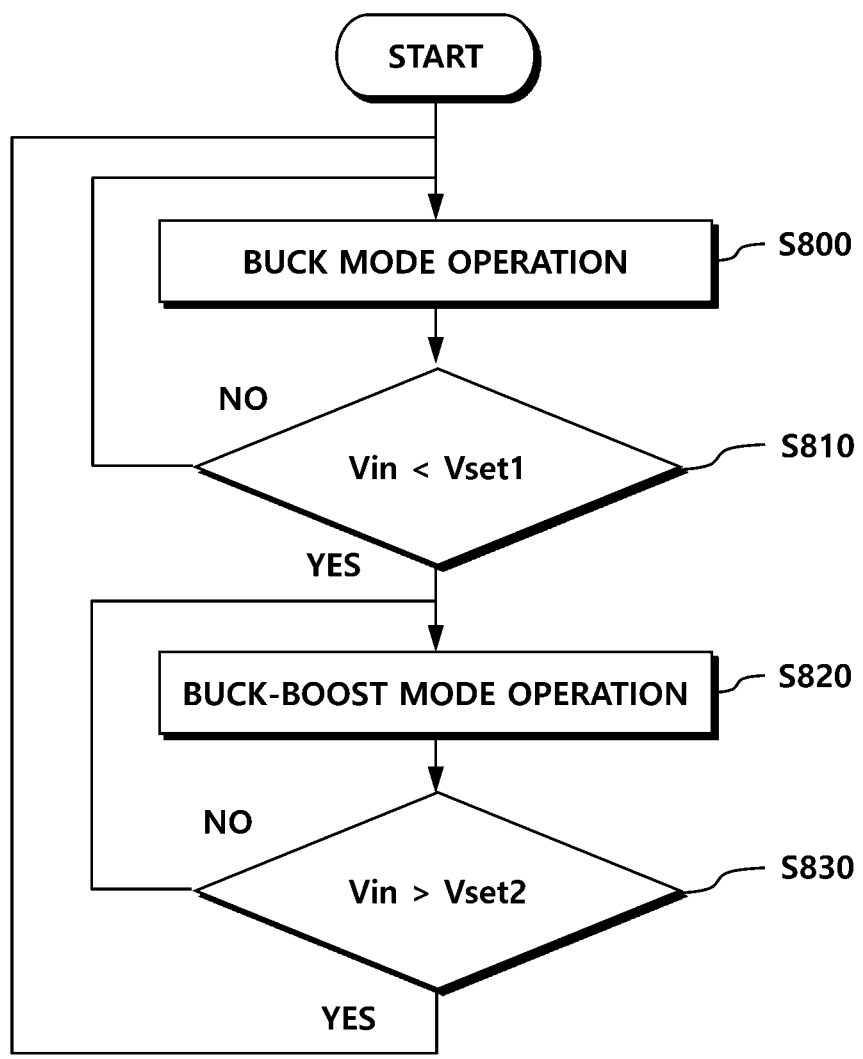
FIG. 8 is a flow chart illustrating a control method of a converter according to an embodiment of the present invention.

FIG. 8 is a flow chart illustrating a control method of a converter according to an embodiment of the present invention.

Referring to FIG. 8, a converter may operate in a buck mode (S800). In this event, an output voltage of the converter may be regulated as a first voltage.

Further, the converter compares (S810) an input voltage Vin and a first configuration voltage Vset1 while operating in the buck mode. In this event, when the input voltage Vin is to be lower than the first configuration voltage Vset1 (Yes in S810), an operation mode of the converter is changed to a boost mode or a buck-boost mode (S820). Further, when the input voltage Vin is not lower than the first configuration voltage Vset1 (NO in S810) from the comparison, the converter continuously operates in the buck mode.

The output voltage of the converter in the boost mode or the buck-boost mode may be regulated as a second voltage. Further, the second voltage may be higher than the first voltage.

Further, the converter compares (S830) an input voltage Vin and a second configuration voltage Vset2 while operating in the boost mode or the buck-boost mode. In this event, when the input voltage Vin is to be higher than the second configuration voltage Vset2 (Yes in S830), an operation mode of the converter is again changed to the buck mode (S810). Further, when the input voltage Vin is not higher than the second configuration voltage Vset2 (NO in S830) from the comparison, the converter continuously operates in the boost mode or the buck-boost mode.

In the control method, the second configuration voltage is configured to be higher than the first configuration voltage, and thus a hysteresis band may be formed in a change of the operation mode.

An embodiment of the present invention has been described above. A converter which operates in two or more modes according to characteristics of a system may be applied. In this event, the converter regulates an output voltage as a value obtained by adding the minimum voltage and a regular offset voltage in order to satisfy a minimum voltage condition in a situation in which a transient is generated according to a profile of a load. In the prior art, the output voltage is configured without distinction of the mode so that a constant loss has been generated to the efficiency of the system. On the contrary, a converter according to an embodiment of the present invention automatically configures the operation mode by an internally measured value, for example, an input value or an output value, and configures different output voltages according to the operation mode, thereby improving the efficiency of the system.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A buck-boost converter comprising:
a converter power stage including at least one inductor and a plurality of switching devices;
a converter control unit including a first mode control unit and a second mode control unit;
the first mode control unit configured to operate the converter power stage in a buck mode and regulate an output voltage of the converter power stage as a first voltage; and
the second mode control unit configured to operate the converter power stage in a boost mode or a buck-boost mode, and regulate the output voltage of the converter power stage as a second voltage higher than the first voltage;
wherein the converter control unit regulates output voltage of the converter power stage according to a feedback voltage input through a sensing resistance, and an output voltage variation unit adjusts the size of the sensing resistance to allow the feedback voltage in the buck mode to be higher than the feedback voltage in the boost mode or the buck-boost mode.

2. The buck-boost converter of claim 1, further comprising:
a mode conversion unit configured to allow one of the first mode control unit and the second mode control unit to selectively control the converter power stage according to an event.

3. The buck-boost converter of claim 2, wherein the event is generated by a comparator for comparing an input voltage and a configuration voltage of the converter power stage.

4. The buck-boost converter of claim 3, wherein the comparator includes a hysteresis band.

5. The buck-boost converter of claim 3, wherein the configuration voltage is the sum of the output voltage and an offset voltage of the converter power stage.

6. The buck-boost converter of claim 1, wherein, when the converter power stage operates in the boost mode or the buck-boost mode in comparison with operating in the buck mode; and
wherein the output voltage according to a load change has a high transient.

7. The buck-boost converter of claim 1, wherein the first mode control unit controls the converter power stage when the input voltage of the converter power stage is in a high voltage range, and the second mode control unit controls the converter power stage when the input voltage of the converter power stage is in a low voltage range.

8. The buck-boost converter of claim 1, wherein the converter power stage includes the sensing resistance for sensing the output voltage, and the sensing resistance corresponds to a variable resistance in which a size thereof is changed according to an operation mode of the converter power stage.

9. The buck-boost converter of claim 1, wherein a battery voltage is used as the input voltage of the converter power stage.

10. A buck-boost converter comprising:
a converter power stage including an inductor, a first switching device, a second switching device, a third switching device, a fourth switching device, and a sensing resistance, wherein one side of the first switching device is connected to an input voltage and the other side thereof is connected to the inductor, one side of the second switching device is connected to the first switching device and the inductor and the other side thereof is connected to a low voltage line, one side of the third switching device is connected to an output capacitor and the other side thereof is connected to the inductor, one side of the fourth switching device is connected to the third switching device and the inductor and the other side thereof is connected to the low voltage line, and the sensing resistance senses a voltage of the output capacitor;
a converter control unit configured to operate the converter power stage in one mode of the buck mode and the boost mode, or one mode of the buck mode and the buck-boost mode; and
an output voltage variation unit configured to adjust a size of the sensing resistance according to an operation mode of the converter power stage and then change the output voltage of the converter power stage based on the mode;
wherein the converter control unit regulates the output voltage of the converter power stage according to a feedback voltage input through the sensing resistance, and the output voltage variation unit adjusts the size of the sensing resistance to allow the feedback voltage in the buck mode to be higher than the feedback voltage in the boost mode or the buck-boost mode.

11. A method of controlling a converter including at least one inductor and a plurality of switching devices, the method comprising:
operating a converter in a buck mode and regulating an output voltage of the converter as a first voltage;
changing an operation mode of the converter to a boost mode or a buck-boost mode when an input voltage of the convert is to be lower than a first configuration voltage while the converter operates in the buck mode;
operating the converter in the boost mode or the buck-boost mode and regulating the output voltage of the converter as a second voltage higher than the first voltage;
changing the converter to be in the buck mode when the input voltage of the converter is to be higher than a second configuration voltage while the converter operates in the boost mode or the buck-boost mode;
regulating the output voltage of a converter power stage according to a feedback voltage input through a sensing resistance with a converter control unit; and
adjusting a size of the sensing resistance to allow the feedback voltage in the buck mode to be higher than the feedback voltage in the boost mode or the buck-boost mode with an output voltage variation unit.

12. The method of claim 11, wherein the second configuration voltage is configured to be higher than the first configuration voltage.

* * * * *